(12) United States Patent
Austin et al.

(10) Patent No.: US 11,948,227 B1
(45) Date of Patent: Apr. 2, 2024

(54) ELIMINATING THE APPEARANCE OF VEHICLES AND/OR OTHER OBJECTS WHEN OPERATING AN AUTONOMOUS VEHICLE

(71) Applicant: Toyota Motor Engineering & Manufacturing North America, Inc., Plano, TX (US)

(72) Inventors: Benjamin Piya Austin, Saline, WI (US); John K. Lenneman, Okemos, MI (US); George M. Evans, Ann Arbor, MI (US); Takeshi Yoshida, Ann Arbor, MI (US); William Patrick Garrett, Plymouth, MI (US); Rebecca L. Kirschweng, Whitmore Lake, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/135,947

(22) Filed: Apr. 18, 2023

(51) Int. Cl.
*G06T 11/00* (2006.01)
*G06F 3/01* (2006.01)
(Continued)

(52) U.S. Cl.
CPC .............. *G06T 11/00* (2013.01); *G06F 3/015* (2013.01); *G06T 5/002* (2013.01); *G06V 20/20* (2022.01);
(Continued)

(58) Field of Classification Search
CPC ................. G06T 11/00; G06T 5/002; G06T 2207/30252; G06V 20/20; G06V 20/58;
(Continued)

(56) References Cited

U.S. PATENT DOCUMENTS

| 9,162,622 B2 | 10/2015 | Szczerba et al. |
| 11,365,976 B2 * | 6/2022 | Colgate .............. G01C 21/3415 |

(Continued)

FOREIGN PATENT DOCUMENTS

| CN | 109204326 A | 1/2019 |
| WO | 2021085691 A1 | 5/2021 |
| WO | 2021112274 A1 | 6/2021 |

*Primary Examiner* — Tom V Sheng
(74) *Attorney, Agent, or Firm* — Dinsmore & Shohl LLP

(57) ABSTRACT

Certain embodiments of the present disclosure provide techniques for eliminating an appearance of one or more objects in an environment surrounding a vehicle during operation of the vehicle. A method generally includes detecting the one or more objects in first sensor data collected from first sensors onboard the vehicle, wherein the first sensor data is representative of the environment surrounding the vehicle; receiving, from other vehicles, second sensor data collected from second sensors onboard the other vehicles, wherein the second sensor data is representative of the environment surrounding each of the one or more other vehicles; generating one or more augmented reality images depicting portions of the environment obstructed by the one or more objects in the first sensor data; displaying the one or more augmented reality images in an augmented reality display such that the augmented reality images are positioned to overlay the one or more objects.

20 Claims, 7 Drawing Sheets

(51) Int. Cl.
  *G06T 5/00* (2006.01)
  *G06V 20/20* (2022.01)
  *G06V 20/58* (2022.01)
  *G09G 3/00* (2006.01)
  *B60K 35/00* (2006.01)
  *G02B 27/01* (2006.01)

(52) U.S. Cl.
  CPC ............ *G06V 20/58* (2022.01); *G09G 3/002* (2013.01); *B60K 35/00* (2013.01); *B60K 2370/1529* (2019.05); *B60K 2370/177* (2019.05); *B60R 2300/205* (2013.01); *B60R 2300/308* (2013.01); *G02B 27/01* (2013.01); *G06F 2203/011* (2013.01); *G06T 2207/30252* (2013.01); *G06V 2201/08* (2022.01)

(58) Field of Classification Search
  CPC ... G06F 3/015; G06F 2203/011; G09G 3/002; B60K 2370/1529; B60K 2370/177; B60K 35/00; G60V 2201/08; B60R 2300/205; B60R 2300/308; G02B 27/01
  USPC .......................................................... 345/156
  See application file for complete search history.

(56) References Cited

U.S. PATENT DOCUMENTS

| | | |
|---|---|---|
| 11,383,719 B2 | 7/2022 | Lee et al. |
| 2013/0083061 A1* | 4/2013 | Mishra .................. A63F 13/803 345/633 |
| 2015/0154802 A1 | 6/2015 | Song |
| 2020/0218910 A1* | 7/2020 | Herman ................. G06V 20/20 |
| 2020/0269759 A1* | 8/2020 | Watanabe ................. B60R 1/00 |
| 2020/0394906 A1* | 12/2020 | Kim ....................... G06V 20/56 |
| 2021/0155159 A1* | 5/2021 | Kawate ................... B60K 35/00 |
| 2021/0321049 A1* | 10/2021 | Imura ..................... G06T 15/60 |
| 2022/0086400 A1* | 3/2022 | Sugawara ................ B60R 1/00 |
| 2022/0113547 A1* | 4/2022 | Inukai ................ G02B 27/0179 |
| 2022/0134881 A1* | 5/2022 | Wickman ........... G02B 27/0093 701/36 |
| 2023/0055862 A1* | 2/2023 | Hamada ................ G06V 20/58 |
| 2023/0298491 A1* | 9/2023 | Feit ........................ G06T 17/00 345/633 |
| 2023/0306693 A1* | 9/2023 | Gerrese ................ G06T 19/006 345/633 |

* cited by examiner

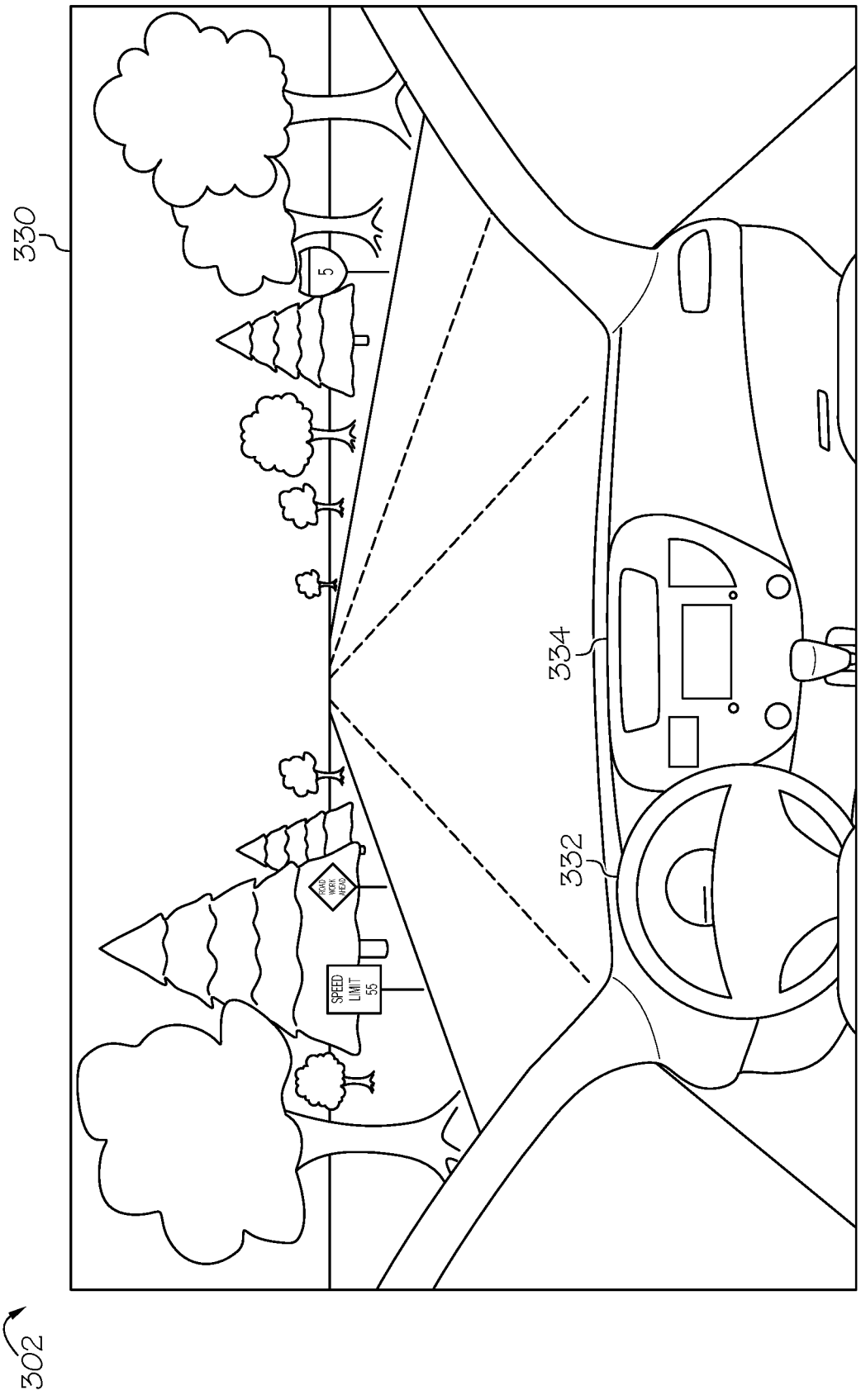

ELIMINATING THE APPEARANCE OF VEHICLES AND/OR OTHER OBJECTS WHEN OPERATING AN AUTONOMOUS VEHICLE

INTRODUCTION

The present specification generally relates to autonomous driving.

BACKGROUND

Automobiles are becoming more intelligent as the industry moves towards deploying increasingly sophisticated self-driving technologies that are capable of operating a vehicle with little or no human input. These (partially and/or fully) autonomous vehicles can detect information about their location and surroundings (for example, using radar, light detection and ranging (LiDAR), global positioning system (GPS), odometers, accelerometers, cameras, and/or other sensors and/or via vehicle-to-vehicle (V2V)/vehicle-to-infrastructure (V2I)/vehicle-to-everything (V2X) communication from other vehicles and/or infrastructure), and typically include control systems that interpret sensory information to identify hazards and determine navigation paths to follow. As such, autonomous vehicles are those in which operation of the vehicle occurs without direct user input to control the steering, acceleration, and/or braking. As used herein, "operating" a vehicle refers to controlling the function of a motor vehicle with the motor running, including while temporarily stationary due to traffic and/or momentary delays.

Autonomous vehicles are designed such that a user of the vehicle is not expected to constantly monitor a roadway while the vehicle is operating in the self-driving mode. For example, the Society of Automotive Engineers (SAE) defines six levels for driving automation ranging from zero (fully manual) to five (fully autonomous). SAE level 3 (e.g., "Conditional Driving Automation) refers to autonomous vehicles capable of operating themselves, but only under ideal conditions and with limitations, such as limited-access divided highways at certain speeds. A user of the vehicle may still be expected to take over operation of the vehicle when road conditions fall below ideal conditions and/or other safety-concerning situations; thus, the user of an SAE level 3 autonomous vehicle is expected to remain attentive and ready to take over operation (e.g., in some cases, when requested). On the other hand, SAE level 4 ("High Driving Automation") and SAE level 5 ("Full Driving Automation") vehicles refer to autonomous vehicles capable of operating in a self-driving (e.g., self-operating) mode. SAE level 4 vehicles may operate autonomously in designated areas (e.g., college campuses), while SAE level 5 vehicles are not geographically limited with respect to their operation. Where the system is fully automated, such as in SAE level 4 and level 5 vehicles, a user may have no responsibility for the operation of the vehicle; the users are simply "passengers" of the vehicle. As used herein, a "user" of a vehicle may refer to a driver of a partially autonomous vehicle (e.g., an SAE level 3 vehicle), a passenger of a fully autonomous vehicle (e.g., an SAE level 4 and/or level 5 vehicle) in the user's seat, or any other occupant riding in the vehicle. Further, "using" a vehicle may refer to a user of a partially autonomous vehicle riding within the vehicle while the vehicle is in operation (e.g., while remaining attentive), a passenger of a fully autonomous vehicle riding within the vehicle while the vehicle is in operation, or any other passenger riding within the vehicle while the vehicle is in operation.

Accordingly, the user may desire not to perceive other vehicles and/or objects (e.g., stop signs, traffic lights, road signs, etc.) on (and/or close to) the road when using the autonomous vehicle. For example, experiencing seemingly endless traffic jams may take a toll on a user's physiological well-being, stemming from the sense of helplessness experienced while in traffic, and/or from its unpredictability. As such, a user of the vehicle may be more inclined to want a view of the real-world environment surrounding the vehicle without such vehicles to avoid experiencing the stress of sitting in traffic. In another example, a user may wish to view their surroundings in scenic areas, such as when driving through the mountains or driving near a beach; however, other vehicles and/or objects on the road may take away from this scenic experience. As such, removal of these other vehicles and/or objects from the user's view may be desired.

It should be noted that the information included in the Background section herein is simply meant to provide a reference for the discussion of certain embodiments in the Detailed Description. None of the information included in this Background should be considered as an admission of prior art.

SUMMARY

Certain embodiments provide a method for eliminating an appearance of one or more objects in a real-world environment surrounding a vehicle during operation of the vehicle. The method generally includes receiving data from the vehicle indicating at least a location of the vehicle within the real-world environment. The method generally includes detecting the one or more objects in first sensor data collected from one or more first sensors onboard the vehicle, wherein the first sensor data is representative of the real-world environment surrounding the vehicle that is observable within a field of view of an augmented reality display associated with the vehicle. The method generally includes receiving, from one or more other vehicles in the real-world environment, a location of each of the one or more other vehicles in the real-world environment. The method generally includes receiving, from the one or more other vehicles, second sensor data collected from one or more second sensors onboard the one or more other vehicles, wherein the second sensor data is representative of the real-world environment surrounding each of the one or more other vehicles. The method generally includes generating one or more augmented reality images depicting portions of the real-world environment obstructed by the one or more objects in the first sensor data using the second sensor data collected from the one or more other vehicles and based on the location of each of the one or more other vehicles and the location of the vehicle. The method generally includes displaying the one or more augmented reality images in the augmented reality display such that the one or more augmented reality images are positioned to overlay the one or more objects.

Other embodiments provide processing systems configured to perform the aforementioned method as well as those described herein; non-transitory, computer-readable media comprising instructions that, when executed by one or more processors of a processing system, cause the processing system to perform the aforementioned method as well as those described herein; a computer program product embodied on a computer readable storage medium comprising code for performing the aforementioned method as well as those further described herein; and a processing system comprising means for performing the aforementioned method as well as those further described herein.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3E schematically depicts the real-world environment surrounding the host vehicle in FIG. 3A that is observable within the field of view of the AR display employed by the host vehicle with the neighboring vehicles removed, according to one or more embodiments shown and described herein.

DETAILED DESCRIPTION

Figure 1:
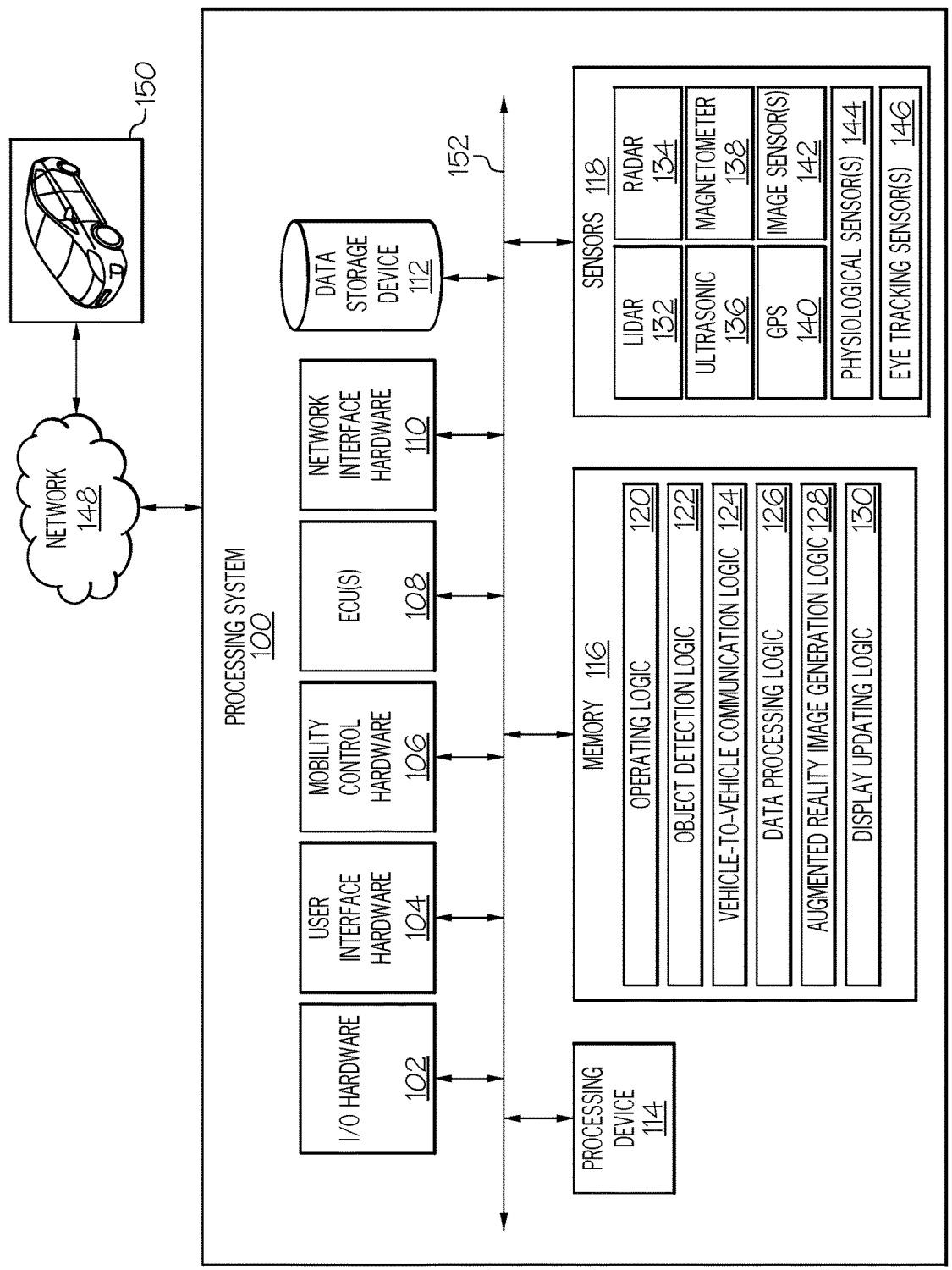
FIG. 1 schematically depicts illustrative hardware components of vehicle processing system, according to one or more embodiments shown and described herein.

Embodiments described herein provide methods, apparatuses, processing systems, and computer-readable mediums for eliminating an appearance of one or more objects in a real-world environment surrounding an autonomous vehicle during operation of the autonomous vehicle. The objects in the real-world environment may include static objects, such as stop signs, road signs, and/or traffic lights, as well as dynamic objects, such as other vehicles, swaying trees, and/or flying birds. However, the above-described objects are not an exhaustive list, and many other objects may be detected and eliminated from a view of a user using the autonomous vehicle. As used herein, an autonomous vehicle refers to a self-driving vehicle, which is a vehicle that can itself (e.g., with little or no human interaction) accelerate, brake, steer, and/or the like. Further, the autonomous vehicle may be capable of sensing its environment and/or navigating without human input and/or external control. The autonomous vehicle may be partially or fully autonomous.

For example, an augmented reality (AR) display associated with the autonomous vehicle described herein may be used to provide a view of an environment surrounding the vehicle where one or more objects, which reside in the real-world environment, are eliminated and replaced with computer-generated images. An AR display is a see-through display that presents information to users of the display (e.g., users within the vehicle), while continuing to allow sight of real-world images, objects, and/or places. AR displays provide a view of items that reside in the real-world that is enhanced by computer-generated perceptual information. In certain embodiments, the AR display functionality is provided by projecting and displaying virtual images (e.g., AR images) on a windshield of the autonomous vehicle, so as to superimpose the virtual images onto an actual view in a field of view of a user of the vehicle. In certain embodiments, the AR display functionality is provided by projecting and displaying virtual images in a display of a wearable device (e.g., AR glasses, a head-mounted AR display, etc.) worn by a user of the autonomous vehicle.

The computer-generated images used to replace the objects in the real-world environment surrounding the vehicle may be generated based on information collected from other vehicles in proximity to the autonomous vehicle. For example, the autonomous vehicle described herein may be configured to engage in vehicle-to-vehicle (V2V) communications with one or more other vehicles. V2V communication enables the vehicle to wirelessly communicate and/or exchange information about its speed, location, surroundings, and/or heading with other vehicles in proximity to the vehicle. As such, a system of the autonomous vehicle described herein, equipped for such communication, may use information received from surrounding vehicles to determine (1) the location of the surrounding vehicles on the road and (2) how the environment around each of these surrounding vehicles appears to each individual vehicle. The vehicle system may be configured to use such information to generate digital data that overlays a real-world environment perceived by a user of the autonomous vehicle, and more specifically, overlay objects in the real-world environment such that the objects are eliminated from the user's view.

Although embodiments herein are described in the context of vehicle processing systems for autonomous automotive vehicles, embodiments are not limited thereto. For example, the processing systems described herein may be configured and compatible for use with various autonomous transportation systems having devices with AR display functionality, including, for example, motorcycles, watercrafts, aircrafts, and/or the like. Other uses should generally be understood and are included within the scope of the present disclosure.

FIG. 1 schematically depicts a non-limiting example of an illustrative vehicle processing system 100. In particular, FIG. 1 schematically depicts illustrative hardware components of the processing system 100 that may be used to provide a functionality of the processing system 100 described in further detail herein. Generally, the illustrative vehicle processing system 100 depicted in FIG. 1 is positioned within a vehicle (not shown in FIG. 1) and provides particular use in assisting users (e.g., a user of a partially autonomous vehicle, a passenger of a fully autonomous vehicle in the driver's seat, or any other occupant riding in the vehicle) of the vehicle in controlling the vehicle and/or various vehicle systems of vehicle. However, it should be appreciated that vehicle processing system 100 is not limited to this use and may be used for other purposes without departing from the scope of the present disclosure.

The example vehicle processing system 100 generally includes a non-transitory computer-readable medium containing one or more programming instructions for completing the various processes described herein, which may be embodied as hardware, software, and/or firmware, according to embodiments shown and described herein. While in some embodiments the various components of vehicle processing system 100 may be configured as a general purpose computer with the requisite hardware, software, and/or firmware, in other embodiments, the various components of the vehicle processing system 100 may also be configured as a special purpose computer designed specifically for performing the functionality described herein.

Vehicle processing system 100 may include a processing device 114, input/output (I/O) hardware 102, user interface hardware 104, mobility control hardware 106, electronic control units (ECUs) 108, network interface hardware 110, a data storage device 112, memory 116, and one or more sensors 118. A local interface 152, such as a bus or the like, may interconnect the various components of processing system 100.

The processing device 114, such as a computer processing unit (CPU), may be the central processing unit of processing system 100, performing calculations and logic operations to execute a program. Processing device 114, alone or in conjunction with the other components, comprises one or more processing devices, one or more computing devices, and/or one or more processors. Processing device 114 may include any processing component configured to receive and execute instructions (such as from data storage device 112 and/or memory 116).

I/O hardware 102 may communicate information between the local interface 152 and one or more other components of processing system 100. For example, I/O hardware 102 may act as an interface between the various components described with respect to FIG. 1 and other components of processing system 100 and/or the vehicle where processing system 100 is implemented, such as user interface hardware 104 that controls information communicated to a user of the vehicle, mobility control hardware 106 that controls movement and/or steering of the vehicle, ECUs 108 that controls functions of various systems and/or devices of the vehicle, and/or the like. I/O hardware 102 may be utilized to communicate (e.g., receive and transmit) one or more commands to the other components of processing system 100 in certain embodiments.

User interface hardware 104 may include any device, mechanism, system, interactive display, and/or various other hardware components for communicating information from processing system 100 to a user of the vehicle. For example, user interface hardware 104 may include input hardware, such as a touch screen, button, microphone, and/or other device for receiving inputs from the user. User interface hardware 104 may further include display hardware, such as, for example, a monitor, a video card, a head-up display, a dashboard display, a mirror display, and/or other another device for sending and/or presenting visual data to the user.

In certain embodiments, user interface hardware 104 includes an AR display. In certain embodiments, the AR display is integrated into the windshield of the vehicle. For example, in certain embodiments, the windshield of the vehicle is transformed into a head-up display where AR images may be projected and displayed to the user. The head-up display may be at least partially transparent to allow the user to continue to view the real-world environment surrounding the vehicle. The user of the vehicle may view the head-up display, and the head-up display may display the graphical overlay of AR images generated by processing system 100 (e.g., as described in detail below). The AR images may be projected anywhere on the head-up display. As another example, in certain embodiments, the windshield itself is a selectively-localized transparent monitor where the AR images are shown in selectively-localized regions, while other regions of the display are transparent.

In certain embodiments, the AR display is any AR headset, goggles, or glasses worn by a user of a vehicle. The AR display may generate head position data that describes the orientation of the user's head while the user is wearing the AR display. In certain embodiments, the AR display is configured to be at least partially transparent such that when worn, the user is able to view both the real-world environment and generated AR images displayed in the AR display. In certain embodiments, the AR display is configured to display a completely digital image, with the generated AR images, with zero-transparency (e.g., where appropriate and/or selected by the user).

In certain embodiments, the AR display includes a non-transitory cache or buffer that temporarily stores data (e.g., AR images) that it receives from processing device 114.

Mobility control hardware 106 may comprise one or more hardware components for controlling a movement, power, functionality, or operation of various components of the vehicle that influence a movement and/or steering of the vehicle. For example, mobility control hardware 106 may include a steering wheel, gas pedal, brake pedal, wheels, and/or the like for controlling a movement, steering, acceleration, and/or deceleration of the vehicle. Such hardware components may generally be configured to generate and transmit one or more signals to one or more motors coupled to the vehicle to effect movement of the vehicle.

ECUs 108 may include one or more hardware components for controlling an actuation, functionality, setting, and/or operation of various controllable vehicle systems and devices of the vehicle. For example, ECUs 108 may control vehicle systems and devices for engine and power steering control, power windows, seat settings, a heating, ventilation and air conditioning (HVAC) system, door locks, keyless entry, airbags, and/or an automatic emergency braking system, to name a few. ECUs 108 may be discrete sets of electronics that include their own circuit(s) (e.g., integrated circuits, microprocessors, memory, storage, etc.) and firmware, sensors, actuators, and/or mounting hardware. ECUs 108 communicate and exchange information via vehicle data bus 152.

Additionally, ECUs 108 may communicate properties (e.g., status of the ECUs 108, sensor readings, control state, error and diagnostic codes, etc.) to and/or receive requests from each other. For example, the vehicle may have seventy or more ECUs 108 that are positioned in various locations around the vehicle and are communicatively coupled by the vehicle data bus 152. In the illustrated example, the ECUs 108 include at least a brake control module, a speed control unit, and a telematic control unit. The brake control module may autonomously operate brakes of the vehicle, while the speed control unit may autonomously control a speed at which the vehicle travels. In some examples, the brake control module and the speed control unit receive signals from processing device 114 to control the brakes and the speed, respectively, of the vehicle. Further, the telematic control unit may control tracking of the vehicle. In certain embodiments, ECUs 108 work together to provide autonomous driving functionality to the vehicle.

Network interface hardware 110 provides processing system 100 with access to external networks, such as network 148, and thereby external processing systems and/or computing devices. Network interface hardware 110 can be any device capable of transmitting and/or receiving data via network 148. Accordingly, network interface hardware 110 can include a communication transceiver for sending and/or receiving any wired and/or wireless communication. For example, network interface hardware 110 may include an antenna, a modem, LAN port, WiFi card, WiMAX card, mobile communications hardware, near-field communication hardware, satellite communication hardware and/or any wired or wireless hardware for communicating with other networks and/or devices/systems. In certain embodiments, the network interface hardware 110 includes hardware configured to operate in accordance with the Bluetooth® wireless communication protocol.

In certain embodiments, network interface hardware 110 may be used by processing system 100 (e.g., deployed on the vehicle) to engage in V2V communication with other vehicles. In particular, network interface hardware 110 may be used to communicate with and transmit/receive data with other vehicles over network 148. In certain embodiments, data received by the vehicle, from one or more other vehicles, via network interface hardware 110, includes data indicating a location of each of the one or more other vehicles, an orientation of each of the one or more other vehicles, a speed of each of the one or more other vehicles, and/or sensor data collected from sensors onboard the one or more other vehicles. As described in detail below, the sensor data, received by the vehicles from the one or more other vehicles, may be representative of the real-world environment surrounding each of the one or more other vehicles.

Data storage device 112, which may generally be a storage medium, may contain one or more data repositories for storing data that is received and/or generated by processing system 100. Data storage device 112 may be any physical storage medium, including, but not limited to, a hard disk drive (HDD), solid-state memory, removable storage, and/or the like. While data storage device 112 is illustrated as a local device to processing system 100, in certain other embodiments, data storage device 112 is a remote storage device, such as, for example, a server computing device, cloud based storage device, and/or the like.

The one or more sensors 118 may generally include the various sensors described herein, including, for example, one or more light detection and ranging (LiDAR) sensors 132, one or more radio detection and ranging (RADAR) sensors 134, one or more ultrasonic sensors 136, one or more magnetometers 138, a global positioning system (GPS) 140, one or more image sensors 142, and/or one or more physiological sensors 144.

The one or more LiDAR sensors 132, RADAR sensors 134, ultrasonic sensors 136, and/or magnetometers 138 may be used to collect information about a location of the vehicle, orientation of the vehicle, direction in which the vehicle is moving, and/or the like. Additionally, in certain embodiments, GPS 140 is used to supplement this information by providing information on the location, movement, direction, and/or speed of the vehicle (e.g., using satellite signals). In certain embodiments, this information is transmitted to processing device 114 for processing to, as described in detail below, generate one or more AR images for display via an AR display associated with the vehicle.

The one or more LiDAR sensors 132, RADAR sensors 134, and ultrasonic sensors 136 may also be configured to collect data that is representative of the real-world environment surrounding the vehicle. The data may include one or more objects detected by the LiDAR sensors 132, RADAR sensors 134, and/or ultrasonic sensors 136. For example, LiDAR sensors 132 may detect and locate objects in the real-world environment surrounding the vehicle via lasers, RADAR sensors 134 may detect and locate objects in the real-world environment surrounding the vehicle via radio waves, and ultrasonic sensors 136 may detect and locate objects in the real-world environment surrounding the vehicle via ultrasonic waves. As described above, the detected objects may include static objects, such as stop signs, road signs, and/or traffic lights, as well as dynamic objects, such as other vehicles, swaying trees, flying birds, and/or the like. In certain embodiments, the data captured by the LiDAR sensors 132, RADAR sensors 134, and/or ultrasonic sensors 136 is representative of the real-world environment, including the one or more objects, surrounding the vehicle that is observable within a field of view of an AR display associated with the vehicle (e.g., the AR display described in detail above).

In certain embodiments, image data produced by one or more image sensors 142 onboard the vehicle, such as optical sensors and/or cameras, may also represent the real-world environment surrounding the vehicle. In particular, the one or more image sensors 142 may be configured to produce, at least, image data capturing the real-world environment, including objects, surrounding the vehicle. The objects may be objects which are also detected by LiDAR sensors 132, RADAR sensors 134, and/or ultrasonic sensors 136 onboard the vehicle. In certain embodiments, the image data captures a location and/or orientation of each of the objects in relation to the vehicle. In certain embodiments, the image data captures a location and/or orientation of each of the objects in relation to each other. In certain embodiments, the image data captures a movement of each object in relation to the vehicle and/or in relation to each other. In certain embodiments, the image data captured by the one or more image sensors 142 is representative of the real-world environment surrounding the vehicle that is observable within a field of view of an AR display associated with the vehicle.

The one or more physiological sensors 144 may be configured to measure physiological signal data for a user of the vehicle and generate one or more signals and/or data to transmit to processing device 114 for processing.

In certain embodiments, the one or more physiological sensors 144 include neuroimaging sensors capable of detecting brainwave signals of a user of the vehicle. The neuroimaging sensors may include near-infrared spectroscopy (NIRS) and/or electroencephalogram (EEG) sensors that are capable of detecting the brainwave signals of the user of the vehicle, in a non-invasive manner. In certain embodiments, the neuroimaging sensors are capable of detecting brainwave signals of the user without requiring direct physical contact between the sensors and a head of the user. It should be understood that the one or more neuroimaging sensors may comprise various other non-invasive, contactless sensors that are configured to detect brainwave signals without requiring physical contact, connection, or engagement with the subject being monitored. In certain embodiments, the one or more physiological sensors 144 include electrocardiogram (ECG) sensors configured to measure a heart rate of the user of the vehicle. For example, one or more ECG sensors may be installed in user seats to allow for non-contact heart rate measurement. In certain embodiments, the one or more physiological sensors 144 include electromyography (EMG) sensors configured to detect muscle activity of a user of the vehicle. In particular, the EMG sensors may be configured to detect when the user lifts their arm, clenches their fist, moves a finger, and/or the like. In certain embodiments, the one or more physiological sensors 144 include photoplethysmography (PPG) sensors configured to measure pulse rate variability of the user.

In certain embodiments, physiological signals and/or data (e.g., collected from EEG sensor(s), ECG sensor(s), EMG sensor(s), PPG sensor(s)), and/or an electrodermal activity (EDA) sensor(s)) transmitted to processing device 114 are used by processing device 114 to determine a physiological state of the user of the vehicle. In certain embodiments, the physiological state determined for the user may include a state of stress, a state of discomfort, an agitated state, a state of drowsiness, a state indicating a lack of attention, a state of distraction, a state of fatigue, and/or the like. For example, ECG signals of the user displaying an increased heart rate, a reduction of heart rate variability, and/or changes in T waves may indicate that the user is experiencing increased mental stress. As another example, EMG signals of the user displaying a decreased amount of muscle movement may indicate that the user is fatigued. In certain embodiments, as described in detail below, such physiological states of the user (e.g., stress, discomfort, agitated, etc.) may trigger the generation of AR images for display to the user. In particular, the AR images may be generated and displayed to cover objects in the user's view while the vehicle is in operation in hopes of altering the physiological state of the user. For example, while sitting in traffic, a user may become agitated. In response to detecting this agitated state of the user, processing system 100 may be configured to generate one or more AR images for display such that that traffic is no longer visible to the user.

In certain embodiments, one or more eye-tracking sensors 146 may also provide insight into the physiological state of the user. In particular, the eye-tracking sensors 146 may be configured to measure eye positions and eye movement of the user. Increased eye movement detected by eye-tracking sensors 146 may contribute to finding that the user is distracted and/or agitated. Alternatively, decreased eye movement detected by eye-tracking sensors 146 may contribute to finding that the user is fatigued. In certain embodiments, image data from image sensor(s) 142 may be analyzed to determine eye movement of the user in addition to, or alternative to, use of the eye-tracking sensor(s) 146. Known methods of tracking and determining eye movement may be employed for determining the eye movement of the user.

Figure 2:
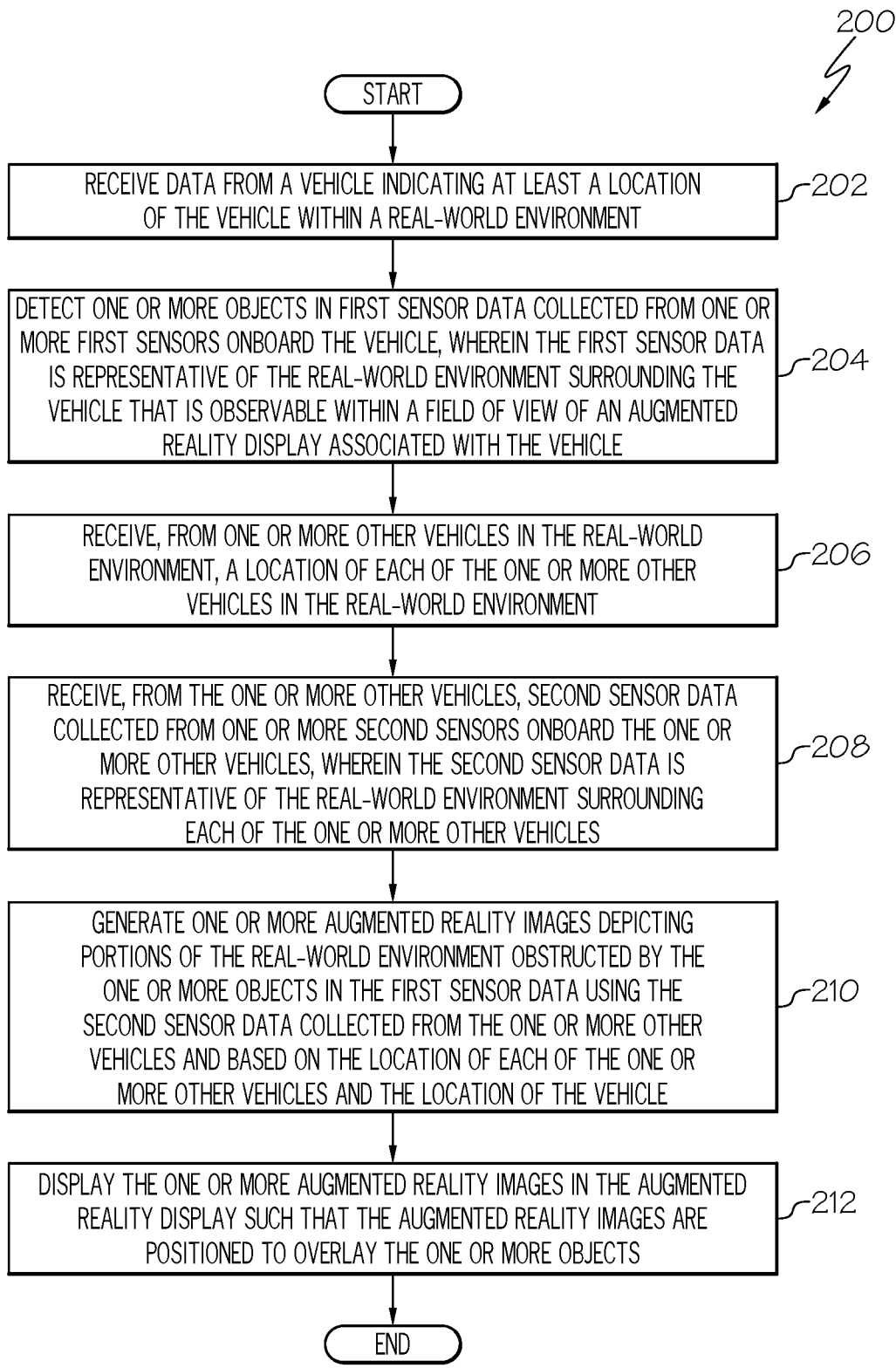
FIG. 2 depicts a flow diagram illustrating example operations for eliminating an appearance of one or more objects in a real-world environment surrounding a vehicle during operation of the vehicle via use of the vehicle processing system depicted in FIG. 1, according to one or more embodiments shown and described herein.

Referring back to FIG. 1, memory 116 may be configured as a volatile and/or a nonvolatile computer-readable medium and, as such, may include one or more programming instructions thereon that, when executed by processing device 114, cause processing device 114 to complete various processes, such as the processes described herein with respect to FIG. 2. The programming instructions stored on memory 116 may be embodied as a plurality of software logic modules, where each logic module provides programming instructions for completing one or more tasks.

For example, FIG. 1 schematically depicts memory 116 containing illustrative logic components according to one or more embodiments shown and described herein. Memory 116 may be configured to store various processing logic, such as, for example, operating logic 120, object detection logic 122, vehicle-to-vehicle (V2V) communication logic 124, data processing logic 126, AR image generation logic 128, and/or display updating logic 130 (each of which may be embodied as a computer program, firmware, or hardware, as an example).

Operating logic 120 may include an operating system and/or other software for managing components of processing system 100.

Object detection logic 122 may include one or more programming instructions for detecting one or more objects (e.g., static and/or dynamic objects) in sensor data collected from LiDAR sensors 132, RADAR sensors 134, ultrasonic sensors 136, and/or image sensors 142. The object detection may include (1) locating objects in the sensors data representing the real-world environment surrounding the vehicle and (2) identifying each object (e.g., identification as an animal, a vehicle, a plant, etc.). In certain embodiments, one or more object detection algorithms may be used to detect such objects. In certain embodiments, detection of the objects includes detecting an object area for each of the objects in the sensor data including the corresponding object. For example, image data received from image sensors 142 may include three vehicles. Objection detection logic 122 may be used by processing device 114 to detect an oval area for each of the three vehicles in the image data, where each oval area includes at least one of the vehicles. In certain other embodiments, the object detection includes detecting each of the objects in the sensor data with finer granularity (e.g., detecting an exact outline of a vehicle in the image data).

V2V communication logic 124 may include one or more programming instructions for wirelessly exchanging information with other vehicles in proximity to the vehicle. The information exchanged between the vehicle and another vehicle in proximity may include information about a speed, a location, an orientation, and/or a heading of the vehicle, the other vehicle, and/or another vehicle which the vehicle or the other vehicle has knowledge about. Further, in certain embodiments, the information exchanged between the vehicle and the other vehicle may include sensor data collected from one or more sensors onboard the other vehicle. The sensor data may include data generated by LiDAR sensors, RADAR sensors, ultrasonic sensors, a GPS, and/or image sensors onboard the other vehicle. The sensor data received by the vehicle, from the other vehicle, may represent the real-world environment surrounding the other vehicle (e.g., from the field of view of sensors onboard the other vehicle).

Data processing logic 126 may include one or more programming instructions for processing, by processing device 114, signals and/or data received from sensors 118. In certain embodiments, data processing logic 126 includes programming instructions for analyzing physiological measurements and/or data received from physiological sensors 144 to determine a physiological state of the user.

AR image generation logic 128 may include one or more programming instructions for generating one or more AR images that are to be displayed to a user of the vehicle. The generated AR images may depict portions of the real-world environment obstructed by objects detected in sensor data received from sensors 118. For example, image data received from image sensor 142 onboard the vehicle may include a stop sign in the field of view of an AR display associated with the vehicle. Thus, an AR image generated via AR image generation logic 128 may represent the real-world environment obstructed by the stop sign (e.g., scenery, such as bushes and/or trees, behind the stop sign). In certain embodiments, the AR images are generated using the sensor data collected from one or more other vehicles in proximity to the vehicle. In certain embodiments, the AR images are generated based on the location, the orientation, the speed, the heading direction, and/or the like of the vehicle. In certain embodiments, the AR images are generated based on the location, the orientation, the speed, the heading direction, and/or the like of each of the one or more other vehicles (e.g., from which the vehicle receives sensor data for generating the AR images).

Display updating logic 130 may include one or more programming instructions for displaying one or more AR images in an AR display associated with the vehicle. In certain embodiments, displaying the AR images includes displaying the AR images such that they positioned to overlay objects detected in sensor data collected from sensors 118 onboard the vehicle. Further, display updating logic 130 may include one or more programming instructions for continuously updating AR images displayed to a user as new AR images are generated. Continuously updating the AR images displayed to the user may help to provide a more real-world view and experience as the vehicle moves.

FIG. 2 depicts a flow diagram illustrating example operations 200 for eliminating an appearance of one or more objects in a real-world environment surrounding a vehicle during operation of the vehicle, according to one or more embodiments shown and described herein. More specifically, operations 200 may be used to provide, to a user of the vehicle, a view of the environment surrounding the vehicle where one or more objects, which reside in the real-world environment, are eliminated and replaced with computer-generated images. Operations 200 may be performed by components of processing system 100 illustrated in FIG. 1. In addition, operations 200 may generally be completed when the vehicle is in active operation. The various operations described with respect to FIG. 2 are merely illustrative, and additional, fewer, or alternative steps are contemplated without departing from the scope of the present disclosure.

Figure 3A:
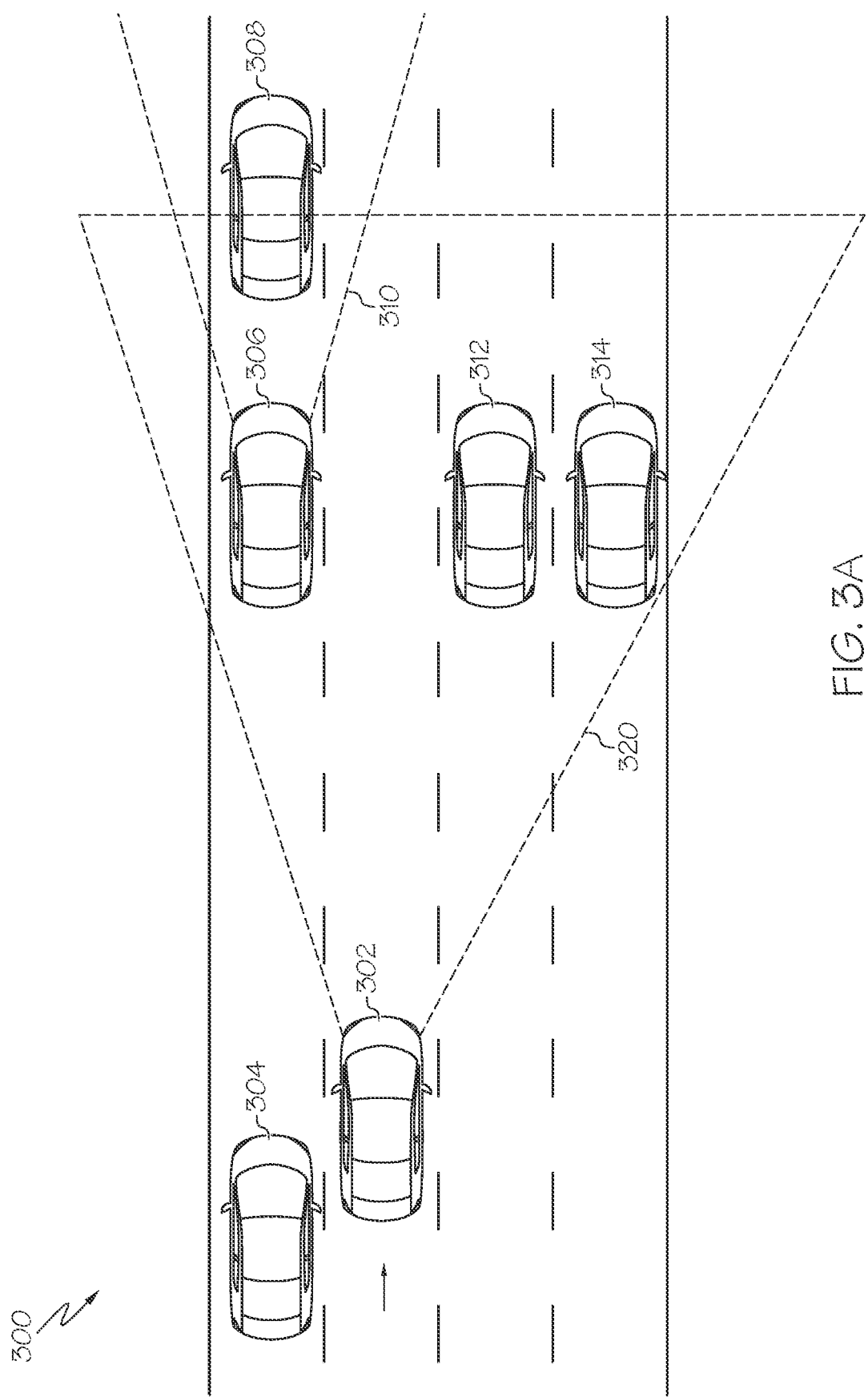
FIG. 3A schematically depicts a top view of an operating environment including a host vehicle and a plurality of neighboring vehicles, according to one or more embodiments shown and described herein.

For ease of explanation, although not meant to be limiting to this particular example, operations 200 are described with respect to the example illustrated in FIGS. 3A-3E. In particular, FIG. 3A schematically depicts a top view of an operating environment 300 including a host vehicle 302 and a plurality of neighboring vehicles 304, 306, 308, 312, and 314. Processing system 100 illustrated in FIG. 1 may be implemented in host vehicle 302. As such, host vehicle 302 may include an AR display for displaying virtual images (e.g., generated AR images) to the user.

Figure 3B:
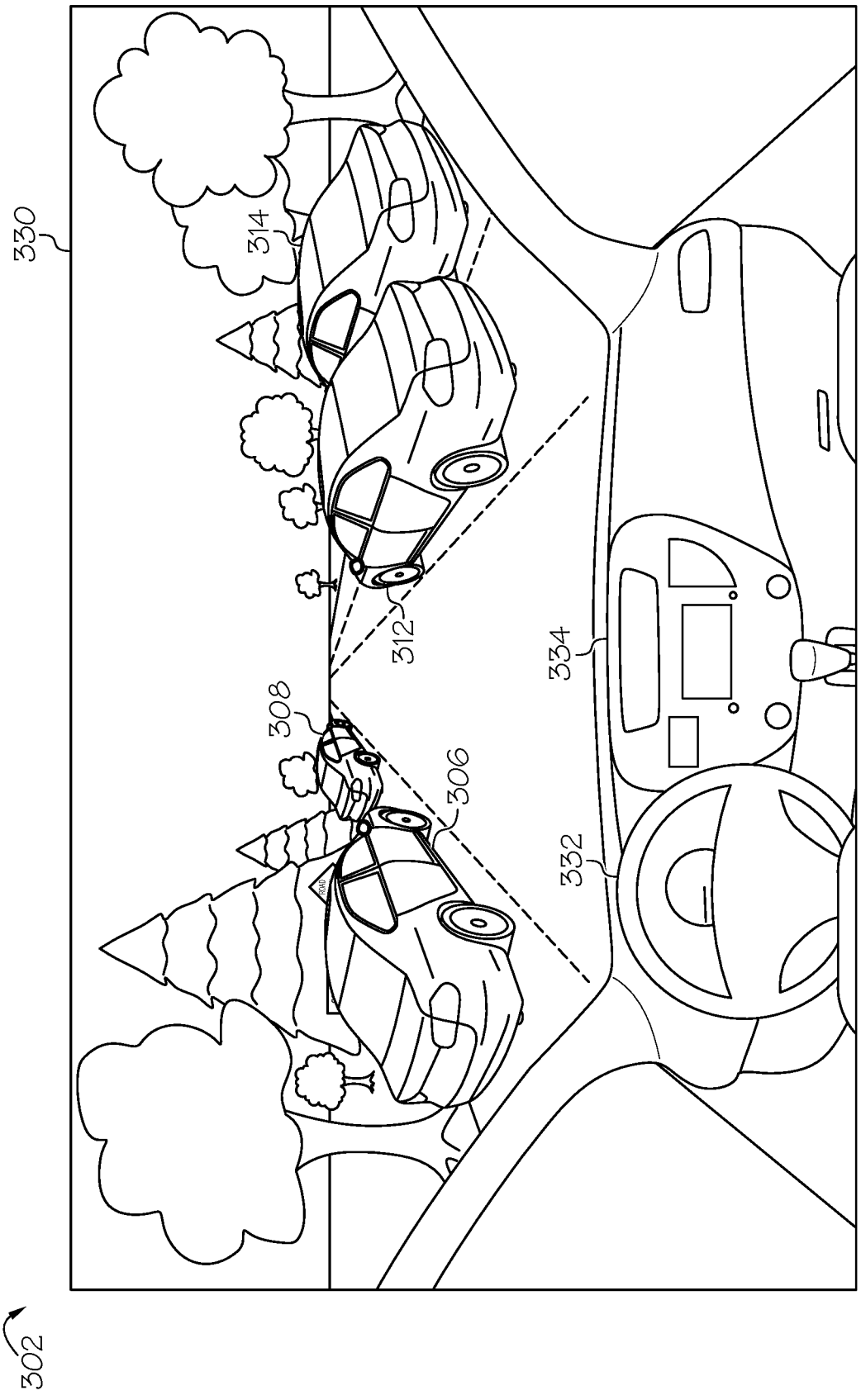
FIG. 3B schematically depicts the real-world environment surrounding the host vehicle in FIG. 3A that is observable within a field of view of an augmented reality (AR) display employed by the host vehicle, according to one or more embodiments shown and described herein.

As illustrated in FIG. 3A, host vehicle 302 and neighboring vehicles 304, 306, 308, 312, and 314 are traveling along a roadway where neighboring vehicle 304 is behind host vehicle 302 and neighboring vehicles 306, 308, 312, and 314 are in front of host vehicle 302 (e.g., also referred to herein as the "other vehicles"). As such, the user of host vehicle 302 may view, through a front windshield, vehicles 306, 308, 312, and 314. However, vehicle 304 may not be visible to the user through the front windshield. In other words, vehicles 306, 308, 312, and 314 may be observable within a field of view 320 of the AR display associated with host vehicle 302 (e.g., observable in an area forward of host vehicle 302). Vehicle 304 may not be observable within the field of view 320 for the AR display. For example, FIG. 3B schematically depicts the real-world environment surrounding host vehicle 302 in FIG. 3A that is observable within the field of view 320 of the AR display. For this example, it may be assumed that the AR display is integrated into the windshield 330 (e.g., above a steering wheel 332 and a dashboard 334) of host vehicle 302. As illustrated in FIG. 3B, vehicles 306, 308, 312, and 314 are, at least partially, visible in the field of view of the AR display. Thus, vehicles 306, 308, 312, and 314 are blocking, from the user's view, scenery and/or other objects in the real-world environment that may be in front of vehicles 306, 308, 312, and 314.

Operations 200 may be performed such that the appearance of vehicles 306, 308, 312, and 314 are (1) eliminated from the view of the user of host vehicle 302 and (2) replaced with computer-generated images depicting the real-world environment that is in front of (e.g., is being obstructed by) vehicles 306, 308, 312, and 314 (e.g., from the viewing perspective of the user of host vehicle 302). Although operations 200 are described with respect to eliminating the appearance of vehicles when host vehicle 302 is in operation, in certain other embodiments, other objects (e.g., traffic signs, trees, mountains, guardrails, etc.) may also be eliminated from the view of the user of host vehicle 302 and/or other passengers within host vehicle 302. Further, although operations 200 are described with respect to replacing the appearance of vehicles with computer-generated images depicting the real-world environment in front of these vehicles, in certain other embodiments, the computer-generated images may be generated to represent one or more other objects (e.g., a tree may be generated to replace one of the vehicles in the field of view 320).

Operations 200 begin, at operation 202, with receiving data from a vehicle indicating at least a location of the vehicle within a real-world environment. For example, at operation 202, processing system 100 may receive data from sensors 118 onboard host vehicle 302 illustrated in FIG. 3A. The data may indicate at least the location of host vehicle 302 in the real-world environment illustrated in FIG. 3A. In certain embodiments, the data may further indicate an orientation, heading direction, speed, and/or the like for host vehicle 302.

Operations 200 proceed, at operation 204, with detecting one or more objects in first sensor data collected from one or more first sensors (e.g., LiDAR, RADAR, ultrasonic, image sensors, etc.) onboard the vehicle. The first sensor data may be representative of the real-world environment surrounding the vehicle that is observable within a field of view of an AR display associated with the vehicle. For example, processing system 100 of host vehicle 302 may receive first sensor data from sensors 118 onboard host vehicle 302. The first sensor data may be representative of the of the real-world environment surrounding host vehicle 302 that is observable within a field of view 320 of the AR display in windshield 330 of host vehicle 302. For example, the first sensor data may include information about, at least, vehicle 306, vehicle 308, vehicle 312, and vehicle 314 in front of host vehicle 302. Thus, at operation 204, processing system 100 detects at least vehicle 306, vehicle 308, vehicle 312, and vehicle 314 (e.g., dynamic objects) in the first sensor data.

Figure 3C:
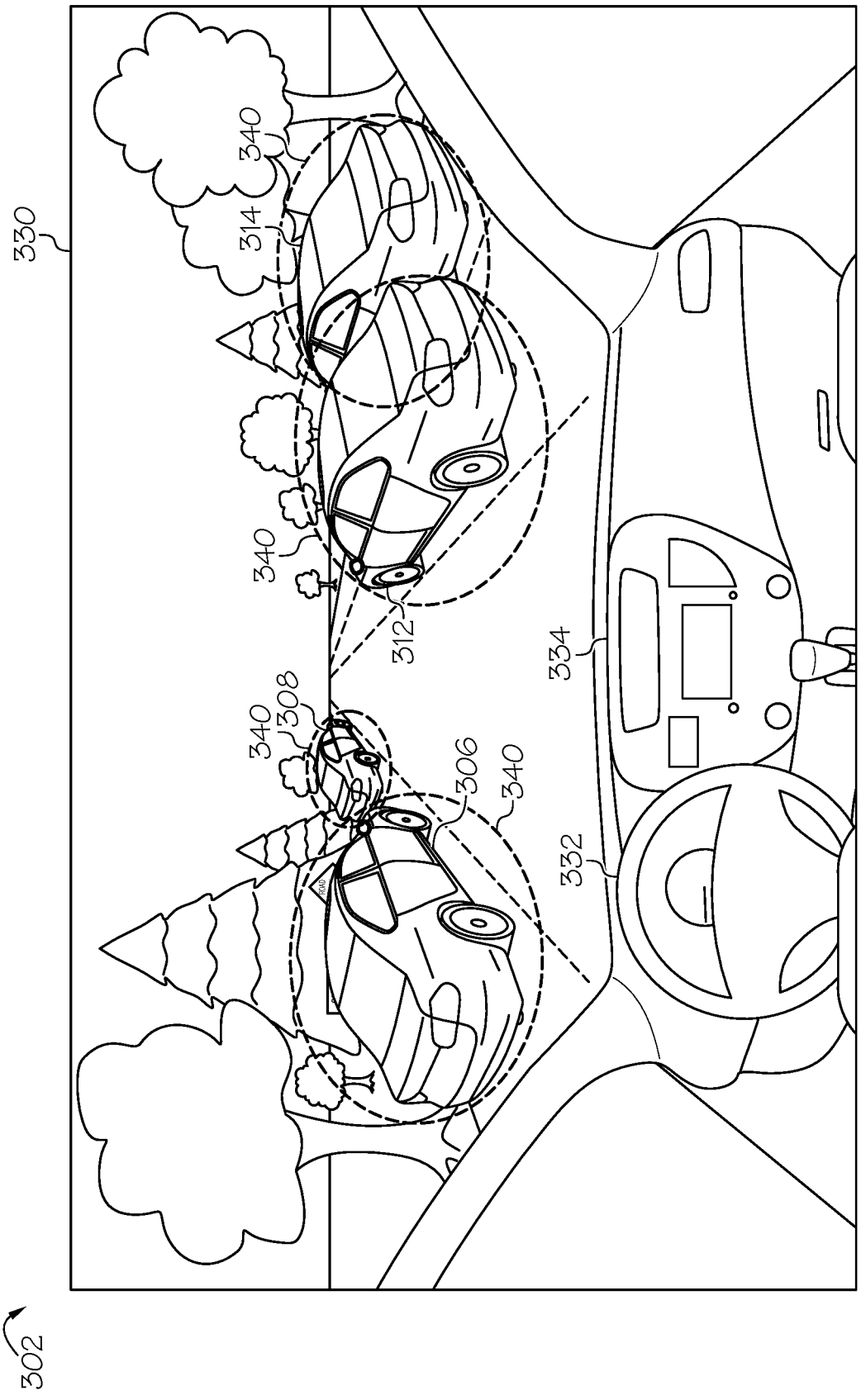
FIG. 3C schematically depicts the detection of the neighboring vehicles in FIG. 3A by a driving support system of the host vehicle, according to one or more embodiments shown and described herein.

In certain embodiments, detecting one or more objects in the first sensor data collected from first sensors onboard the vehicle includes detecting pixels in the sensor data which make up each of the objects such that an exact outline each of the objects may be determined (e.g., more granular detection). In certain embodiments, detecting one or more objects in the first sensor data collected from the first sensors onboard the vehicle includes detecting an object area for each of the objects in the first sensor data including the corresponding object (e.g., less granular detection). For example, as illustrated in FIG. 3C, instead of detecting an exact outline for each of vehicles 306, 308, 312, and 314, processing system 100 may detect an object area for each of the vehicles in the sensor data. In particular, object area 340 detected for vehicle 306 may include at least vehicle 306, object area 340 detected for vehicle 308 may include at least vehicle 308, object area 340 detected for vehicle 312 may include at least vehicle 312, and object area 340 detected for vehicle 314 may include at least vehicle 314 (as well as other objects and/or scenery). Although less granular, such detection may use less resources and/or require less time to detect each of the objects in the sensor data as compared to determining pixels and/or exact locations of each of the objects.

Operations 200 proceed, at operation 206, with receiving, from one or more other vehicles in the real-world environment, a location of each of the other vehicles in the real-world environment. For example, processing system 100 of host vehicle 302 may use network interface hardware 110 to engage in V2V communication with neighboring vehicles 304, 306, 308, 312, and 314. Host vehicle 302 and the respective neighboring vehicles 304, 306, 308, 312, and 314 that have communication capabilities may periodically broadcast wireless messages to one another over a respective inter-vehicle communication network, such as, but not limited to, a dedicated short range communication protocol (DSRC) as known in the art. In this way, host vehicle 302 may obtain information from one or more of the neighboring vehicles 304, 306, 308, 312, and 314. In this example, at operation 206, host vehicle 302 obtains location information from other vehicles 306, 308, 312, and 314. In certain embodiments, at operation 206, host vehicle 302 also Obtains information about a speed, orientation, heading direction, and/or the like for each of the other vehicles 306, 308, 312, and 314. As described in detail below, the location information (and in some cases, the speed, orientation, heading direction, etc.) may be used when generating AR images for display to the user of host vehicle 302.

Operations 200 proceed, at operation 208, with receiving, from the one or more other vehicles, second sensor data collected from one or more second sensors (e.g., LiDAR, RADAR, ultrasonic, image sensors, etc.) onboard the other vehicles. The second sensor data may be representative of the real-world environment surrounding each of the other vehicles. For example, other vehicles 306, 308, 312, and 314 may also have one or more sensors onboard configured to capture the real-world environment surrounding each of other vehicles 306, 308, 312, and 314. For example, one or more sensors onboard vehicle 306 may be situated at various locations within and/or around vehicle 306 such that sensor data collected for vehicle 306 includes at least information about objects in a field of view 310 of sensors onboard vehicle 306 (e.g., vehicle 308, trees to the left of vehicle 306, traffic signs in front of and to the left of vehicle 306). The data captured by these sensors may be transmitted, at operation 208, to host vehicle 302 for purposes of generating AR images.

Operations 200 proceed, at operation 210, with generating one or more AR images depicting portions of the real-world environment obstructed by the one or more objects in the first sensor data. In certain embodiments, the one or more AR images are generated using the second sensor data received from the one or more other vehicles at operation 208. In certain embodiments, the one or more AR images are generated based on the location of each of the other vehicles and the location of the vehicle. In certain embodiments, the one or more AR images are further generated based on additional information (e.g., speed, orientation, heading direction, etc.) received for the one or more other vehicles and/or detected for the vehicle.

Figure 3D:
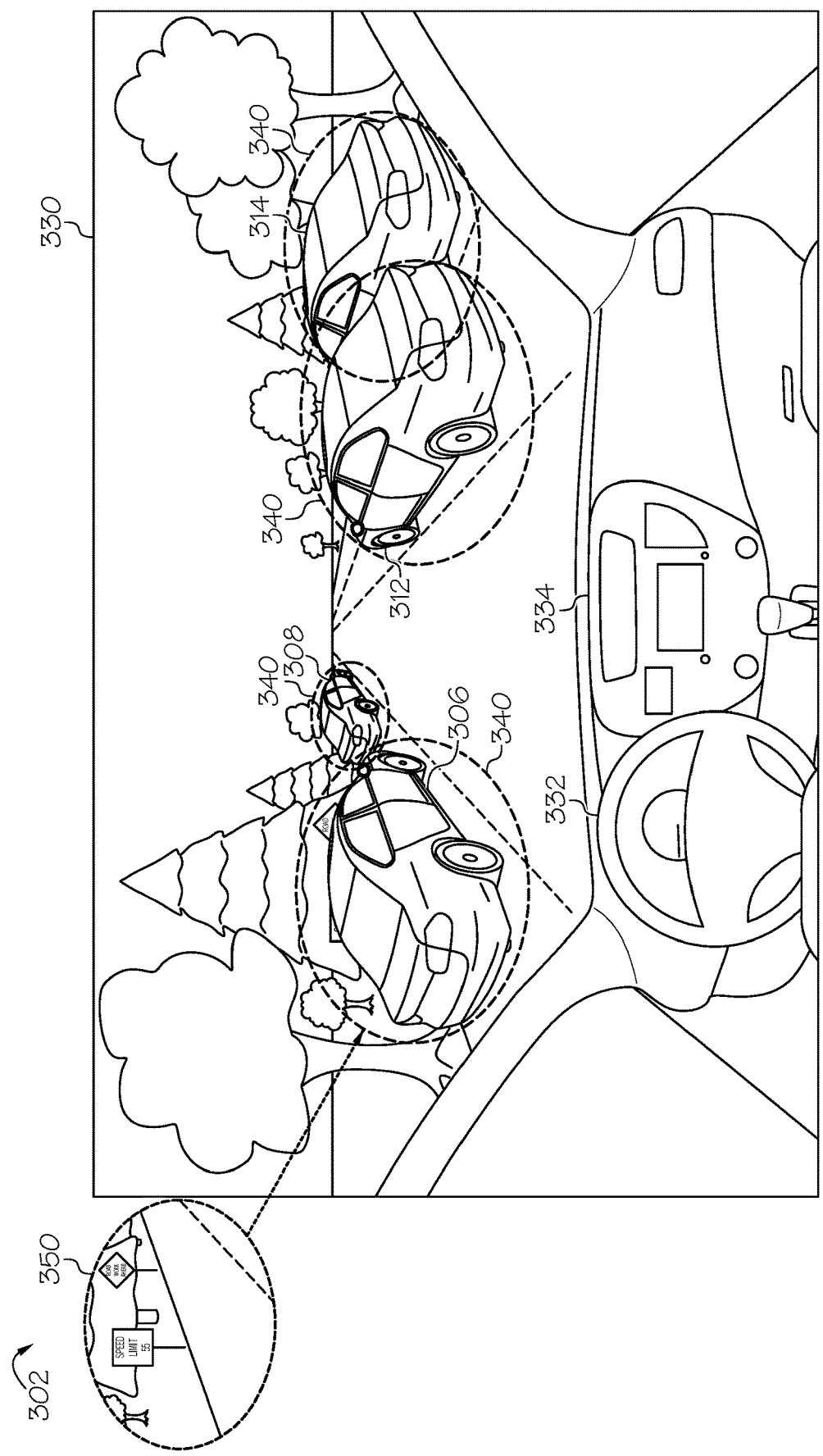
FIG. 3D schematically depicts generated AR images for display in the AR display employed by the host vehicle, according to one or more embodiments shown and described herein.

For example, as illustrated in FIG. 3D, an AR image 350 may be generated to depict a portion of the real-world environment obstructed by vehicle 306 in the field of view 320 of host vehicle 302. In particular, AR image 350 is generated to show the remainder of trees blocked by vehicle 306, lane lines painted on the roadway that are obstructed by vehicle 306, and signs blocked by vehicle 306. In other words, AR image 350 is generated to depict the real-world environment, from the field of view 320 of host vehicle 302, as if vehicle 306 didn't exist.

In certain embodiments, AR image 350 is generated based on second senor data received from one or more of the other vehicles. For example, AR image 350 may be generated based on second sensor data collected from sensors onboard vehicle 306 and/or vehicle 308. In particular, second sensor data from vehicle 308 may also be useful where the sensor data captured by sensors onboard vehicle 306 may also not contain enough information about the real-world environment to generate the AR image given vehicle 308 is in the field of view of sensors onboard vehicle 306 (e.g., vehicle 308 is obstructing objects in the real-world environment). Similarly, second sensor data received from one or more of the other vehicles may be used to generate AR images that are to be displayed such that they overlay object area 340 for vehicle 308, object area 340 for vehicle 312, and object area 340 for vehicle 314.

In certain embodiments, where second sensor data received from multiple other vehicles is used to generate an AR image, processing device 114 may be configured to account for differences in transmission latency (e.g., when sending/receiving sensor data) between the vehicle and each of the vehicles in order to create seamless pictures. For example, in certain embodiments, processing device 114 is configured to (1) determine a latency in communication between the vehicle and each of the one or more other vehicles in the real-world environment from which the vehicle received second sensor data and (2) temporally align second sensor data received from the one or more vehicles based on the latency determined between the vehicle and each of the one or more other vehicles. Processing device 114 may then use the temporally aligned second sensor data to generate the AR image. Further, in certain embodiments, the generated AR image may be re-projected to account for changes in movement of host vehicle 302 from when the second senor data was received and when the AR image is displayed. Additionally, in certain embodiments, the AR image may be generated to account for dynamic objects present within the AR image such that their movement is consistent with the real-world environment when the AR image is displayed to the user (e.g., to provide a realistic and seamless display to the user).

In certain embodiments, the one or more AR images are generated further based on map information. For example, processing system 100 may be configured to access map information representative of an underlying infrastructure of the real-world environment surrounding host vehicle 302. The map information may include, for example, information about the shape and/or curvature of the roadway, lines painted on the roadway, the dimensions of the street signs, the text printed on the street signs, and/or a landmark in the real-world environment, to name a few. This map information may be used in addition to, or alternative to, second sensor data received from the one or more other vehicles to generate the one or more AR images. As such, in certain embodiments (although not illustrated in FIG. 2), operations 200 may not receive vehicle information and/or second sensor data from the other vehicles at operations 206 and 208, respectively. Thus, the AR images may be generated based solely on the map information.

In certain embodiments, the one or more AR images are generated based on historical data, such as image data that was previously collected by a different vehicle at a different time and provided to the vehicle. For example, the one or more images may be generated based on historical data when a part of the environment cannot be perceived by any of the other vehicles (e.g., all local vehicles may have a glare in their sensors). As another example the one or more images may be generated based on historical data during poor weather conditions. In particular, if a user of the vehicle is currently experiencing heavy rain and/or low visibility, then the AR images may be generated based on historical data to construct AR images with no rain and/or having full visibility.

Operations 200 proceed, at operation 212, with displaying the one or more AR images in the AR display associated with the vehicle such that he AR images are positioned to overlay the one or more objects. For example, as shown in FIG. 3D, AR image 350 may be displayed such that AR image 350 is aligned and overlays object area 340. In certain embodiments, one or more blurring mechanisms may be used to soften a perimeter of object area 340. Use of one or more blurring mechanisms may provide a seamless integration of the AR image(s) with the real-world environment in the AR display. Similar techniques may be used to display generated AR images in object area 340 including vehicle 308, in object area 340 including vehicle 312, and in object area 340 including vehicle 314. As such, when all generated AR images are displayed, the user of the vehicle may no longer see vehicles 306, 308, 312, and 314. For example, as shown in FIG. 3E, the user may be able to see the real-world environment with the AR images overlayed such that the vehicles 306, 308, 312, and 314 are eliminated from the user's view.

In certain embodiments, displaying the one or more AR images in the AR display involves replacing each pixel of each identified object, which is to be eliminated from the user's view, with a pixel of a corresponding generated AR image (e.g., pixel per pixel replacement). In such embodiments, blurring mechanisms may also be used to soften a perimeter of each AR image.

As mentioned above, in certain embodiment, the AR display is integrated into the windshield of the vehicle (e.g., as described for this example). Thus, displaying the one or more AR images may include projecting the one or more AR images on the windshield of the vehicle. In certain other embodiments, the AR display is any AR headset, goggles, or glasses worn by the user of the vehicle. The AR display is an at least partially transparent display through which the user can view the real-world environment surrounding the vehicle while the wearable device is worn.

In certain embodiments, image filter(s) are applied to the generated AR images prior to display of the AR images in the AR display. An image filter is a technique through which size, colors, shading and other characteristics of an image are altered. An image filter is used to transform the image using different graphical editing techniques. As such, when an image filter is applied to the AR image, pixels of the AR images may be manipulated prior to display. Example image filters that may be applied include, but are not limited to, a black and white color filter, a sepia color filter, a cool color filter, a warm color filter, a cartoon filter, a thematic filter, and/or any customized filter. In certain embodiments, the user may be presented with options for selecting whether or not a filter is to be applied, and when the filter is to be applied, which AR images the filter is to be applied to and/or which specific filter is to be applied to which AR image. The user may provide their selection(s), and processing device 114 may generate the AR image(s) based on the user's selections. In certain embodiments, the user provides their selections via a IA of the vehicle. In certain embodiments, the AR display includes additional equipment such as AR gloves to manipulate virtual objects displayed by the AR display. Accordingly, in certain embodiments, the user provides their selections via use of the AR gloves. Further, in certain embodiments, the user may select to have a selected filter applied to both the real-world environment and the AR images.

In certain embodiments, generating AR images and display AR images at operations 210 and 212, respectively, are performed when the user is determined to be within a particular physiological state. For example, when the user is determined to be in a state of stress, a state of discomfort, an agitated state, a state of drowsiness, a state indicating a lack of attention, a state of distraction, a state of fatigue, and/or the like, processing device 114 may be triggered to generate AR image(s) for display to the user. More specifically, processing device 114 may be configured to (1) receive physiological measurements for the user via at least one physiological sensor positioned within the vehicle, (2) analyze the physiological measurements to determine a physiological state of the user, and (3) generate and display AR image(s) based on the determined physiological state of the user.

As an illustrative example, a user may be coming home from work in rush hour traffic. Thus, multiple vehicles may be on the roadway causing the user excess stress and agitation. According to embodiments described herein, processing device 114 may determine that the user is experiencing a physiological state of stress and agitation, and in response to making this determination, generate AR images. The AR images may be generated to depict portions of the real-world environment obstructed by the vehicles on the roadway. As such, display of the AR images may remove the appearance of the vehicles on the roadway, from the perspective of the user (e.g., when the user is a "passenger" and the vehicle is an SAE level 4 or level 5 autonomous vehicle). Such AR image generation and display, in some cases, may help to improve the physiological state/mood of the user where the traffic was at least one factor causing the increased stress and/or agitation.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" or "certain" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for eliminating an appearance of one or more objects in a real-world environment surrounding a vehicle during operation of the vehicle, the method comprising:
   receiving data from the vehicle indicating at least a location of the vehicle within the real-world environment;
   detecting the one or more objects in first sensor data collected from one or more first sensors onboard the vehicle, wherein the first sensor data is representative of the real-world environment surrounding the vehicle that is observable within a field of view of an augmented reality display associated with the vehicle;
   receiving, from one or more other vehicles in the real-world environment, a location of each of the one or more other vehicles in the real-world environment;
   receiving, from the one or more other vehicles, second sensor data collected from one or more second sensors onboard the one or more other vehicles, wherein the second sensor data is representative of the real-world environment surrounding each of the one or more other vehicles;
   generating one or more augmented reality images depicting portions of the real-world environment obstructed by the one or more objects in the first sensor data using the second sensor data collected from the one or more other vehicles and based on the location of each of the one or more other vehicles and the location of the vehicle; and
   displaying the one or more augmented reality images in the augmented reality display such that the one or more augmented reality images are positioned to overlay the one or more objects.

2. The method of claim 1, further comprising:
   receiving physiological measurements for a user of the vehicle via at least one physiological sensor positioned within the vehicle; and
   analyzing the physiological measurements received for the user to determine a physiological state of the user, wherein generating and displaying the one or more augmented reality images is based on the determined physiological state of the user.

3. The method of claim 2, wherein the at least one physiological sensor comprises one or more of:
   an electroencephalogram (EEG) sensor,
   an electrocardiogram (ECG) sensor,
   an electromyography (EMG) sensor,
   a photoplethysmography (PPG) sensor, or
   an electrodermal activity (EDA) sensor.

4. The method of claim 1, further comprising:
   applying one or more filters to the one or more augmented reality images to manipulate pixels of the one or more augmented reality images prior to displaying the one or more augmented reality images.

5. The method of claim 1, wherein the one or more objects comprise at least one of static objects or dynamic objects in the real-world environment.

6. The method of claim 1, wherein at least one of the one or more first sensors onboard the vehicle or the one or more second sensors onboard the one or more other vehicles comprise one or more of a camera, a LiDAR sensor, a RADAR sensor, or an ultrasonic sensor.

7. The method of claim 1, wherein generating the one or more augmented reality images depicting portions of the real-world environment obstructed by the one or more objects in the first sensor data comprises:
   determining a latency in communication between the vehicle and each of the one or more other vehicles in the real-world environment;
   temporally aligning second sensor data received from the one or more other vehicles based on the latency determined between the vehicle and each of the one or more other vehicles; and
   generating the one or more augmented reality images depicting portions of the real-world environment using the temporally aligned second sensor data.

8. The method of claim 1, further comprising:
   accessing map information representative of an underlying infrastructure of the real-world environment surrounding the vehicle,
   wherein the one or more augmented reality images are generated further using the map information.

9. The method of claim 1, wherein detecting the one or more objects in the first sensor data collected from the one or more first sensors onboard the vehicle comprises detecting an object area for each of the one or more objects in the first sensor data including the corresponding object.

10. The method of claim 9, wherein displaying the one or more augmented reality images in the augmented reality display such that the one or more augmented reality images are positioned to overlay the one or more objects comprises:
    one or more augmented reality images in the augmented reality display such that the one or more augmented reality images are positioned to overlay the object area for each of the one or more objects; and
    using one or more blurring mechanisms to soften a perimeter of the object area for a seamless integration of the one or more augmented reality images with the real-world environment in the augmented reality display.

11. The method of claim 1, wherein displaying the one or more augmented reality images in the augmented reality display such that the one or more augmented reality images are positioned to overlay the one or more objects comprises replacing each pixel of each of the one or more objects with a pixel of a corresponding augmented reality images among the one or more augmented reality images generated to overlay the corresponding object.

12. The method of claim 1, wherein displaying the one or more augmented reality images in the augmented reality display comprises projecting the one or more augmented reality images on a windshield of the vehicle.

13. The method of claim 1, wherein:
the augmented reality display comprises a display of a wearable device worn by a user of the vehicle; and
the display being an at least partially transparent display through which the user can view the real-world environment surrounding the vehicle while the wearable device is worn.

14. The method of claim 13, wherein the wearable device comprises augmented reality glasses or a head-mounted augmented reality display.

15. A system for eliminating an appearance of one or more objects in a real-world environment surrounding a vehicle during operation of the vehicle, the system comprising:
an augmented reality display associated with the vehicle;
one or more first sensors onboard the vehicle and configured to capture first sensor data, wherein the first sensor data is representative of the real-world environment surrounding the vehicle that is observable within a field of view of the augmented reality display;
one or more second sensors associated with the vehicle and configured to detect at least a location of the vehicle within the real-world environment;
one or more processors; and
at least one memory, the one or more processors and the at least one memory configured to:
receive, from the one or more second sensors, data indicating at least the location of the vehicle within the real-world environment;
receive, from the one or more first sensors, the first sensor data;
detect the one or more objects in the first sensor data;
receive, from one or more other vehicles in the real-world environment, a location of each of the one or more other vehicles in the real-world environment;
receive, from the one or more other vehicles, second sensor data collected from one or more second sensors onboard the one or more other vehicles, wherein the second sensor data is representative of the real-world environment surrounding each of the one or more other vehicles;
generate one or more augmented reality images depicting portions of the real-world environment obstructed by the one or more objects in the first sensor data using the second sensor data collected from the one or more other vehicles and based on the location of each of the one or more other vehicles and the location of the vehicle; and
display, via the augmented reality display, the one or more augmented reality images such that the one or more augmented reality images are positioned to overlay the one or more objects.

16. The system of claim 15, further comprising:
at least one physiological sensor positioned within the vehicle,
wherein the one or more processors and the at least one memory configured to:
receive physiological measurements for a user of the vehicle via the at least one physiological sensor; and
analyze the physiological measurements received for the user to determine a physiological state of the user, wherein to generate and display the one or more augmented reality images is based on the determined physiological state of the user.

17. The system of claim 15, wherein the one or more processors and the at least one memory configured to:
apply one or more filters to the one or more augmented reality images to manipulate pixels of the one or more augmented reality images prior to displaying the one or more augmented reality images.

18. A non-transitory computer-readable medium comprising instructions that, when executed by one or more processors of a computing system, cause the computing system to perform operations for eliminating an appearance of one or more objects in a real-world environment surrounding a vehicle during operation of the vehicle, the operations comprising:
receiving data from the vehicle indicating at least a location of the vehicle within the real-world environment;
detecting the one or more objects in first sensor data collected from one or more first sensors onboard the vehicle, wherein the first sensor data is representative of the real-world environment surrounding the vehicle that is observable within a field of view of an augmented reality display associated with the vehicle;
receiving, from one or more other vehicles in the real-world environment, a location of each of the one or more other vehicles in the real-world environment;
receiving, from the one or more other vehicles, second sensor data collected from one or more second sensors onboard the one or more other vehicles, wherein the second sensor data is representative of the real-world environment surrounding each of the one or more other vehicles;
generating one or more augmented reality images depicting portions of the real-world environment obstructed by the one or more objects in the first sensor data using the second sensor data collected from the one or more other vehicles and based on the location of each of the one or more other vehicles and the location of the vehicle; and
displaying the one or more augmented reality images in the augmented reality display such that the one or more augmented reality images are positioned to overlay the one or more objects.

19. The non-transitory computer-readable medium of claim 18, wherein the operations further comprise:
receiving physiological measurements for a user of the vehicle via at least one physiological sensor positioned within the vehicle; and
analyzing the physiological measurements received for the user to determine a physiological state of the user, wherein generating and displaying the one or more augmented reality images is based on the determined physiological state of the user.

20. The non-transitory computer-readable medium of claim 18, wherein the operations further comprise:
applying one or more filters to the one or more augmented reality images to manipulate pixels of the one or more augmented reality images prior to displaying the one or more augmented reality images.

* * * * *

UNITED STATES PATENT AND TRADEMARK OFFICE
CERTIFICATE OF CORRECTION

PATENT NO. : 11,948,227 B1
APPLICATION NO. : 18/135947
DATED : April 2, 2024
INVENTOR(S) : Benjamin Piya Austin et al.

It is certified that error appears in the above-identified patent and that said Letters Patent is hereby corrected as shown below:

On the Title Page

Item (73), assignee 2, city, delete "Aichi-Ken" and insert --Toyota-shi, Aichi-ken--, therefor.

In the Specification

In Column 15, Line(s) 19, after "such that", delete "he" and insert --the--, therefor.

Signed and Sealed this
Fifth Day of November, 2024

Katherine Kelly Vidal
*Director of the United States Patent and Trademark Office*